S. P. SMURR.
WIRE COILING AND CUTTING MACHINE.
APPLICATION FILED MAR. 22, 1915.

1,262,120.

Patented Apr. 9, 1918.
6 SHEETS—SHEET 1.

WITNESSES

INVENTOR
Samuel P. Smurr
By Cooper L. Redfield
ATTORNEY

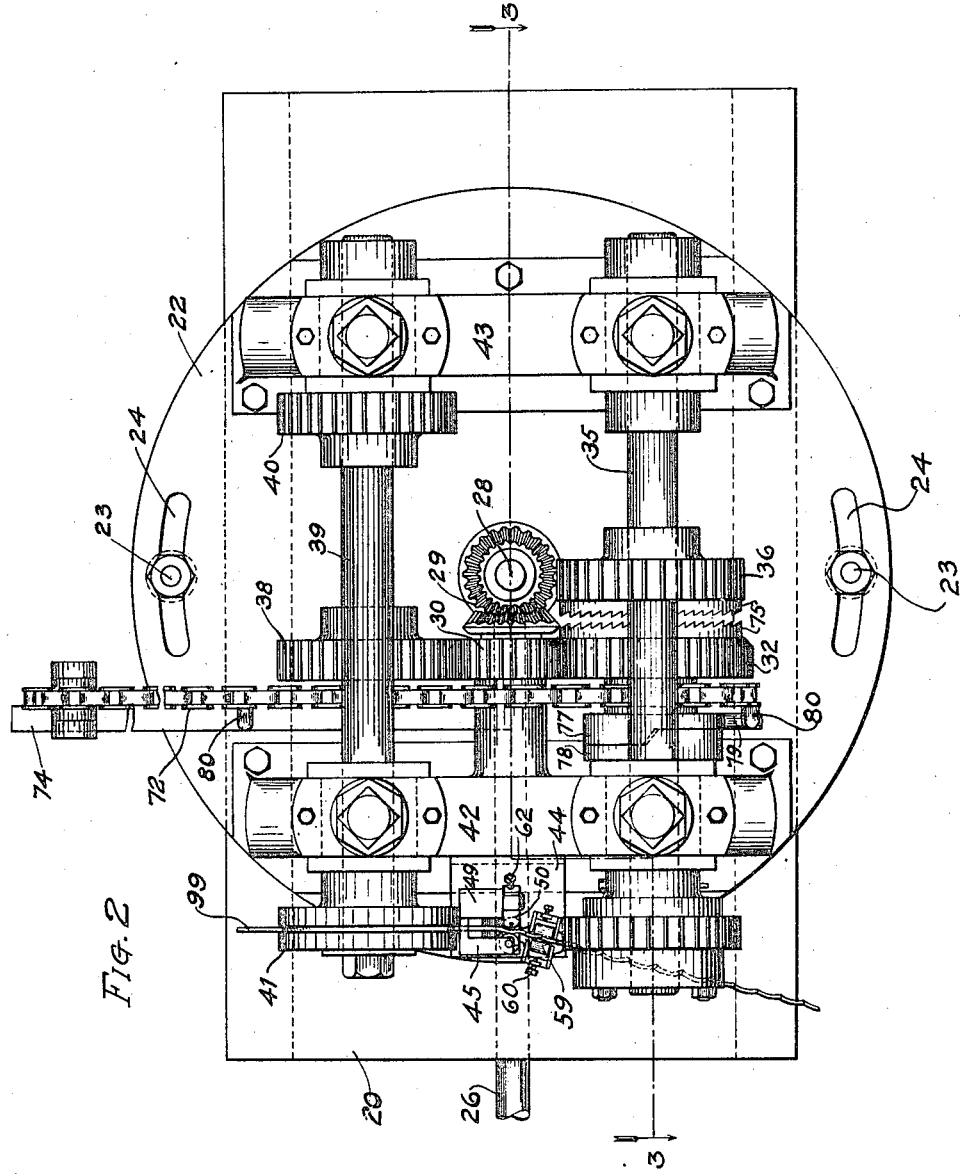

S. P. SMURR.
WIRE COILING AND CUTTING MACHINE.
APPLICATION FILED MAR. 22, 1915.
1,262,120.
Patented Apr. 9, 1918.
6 SHEETS—SHEET 3.
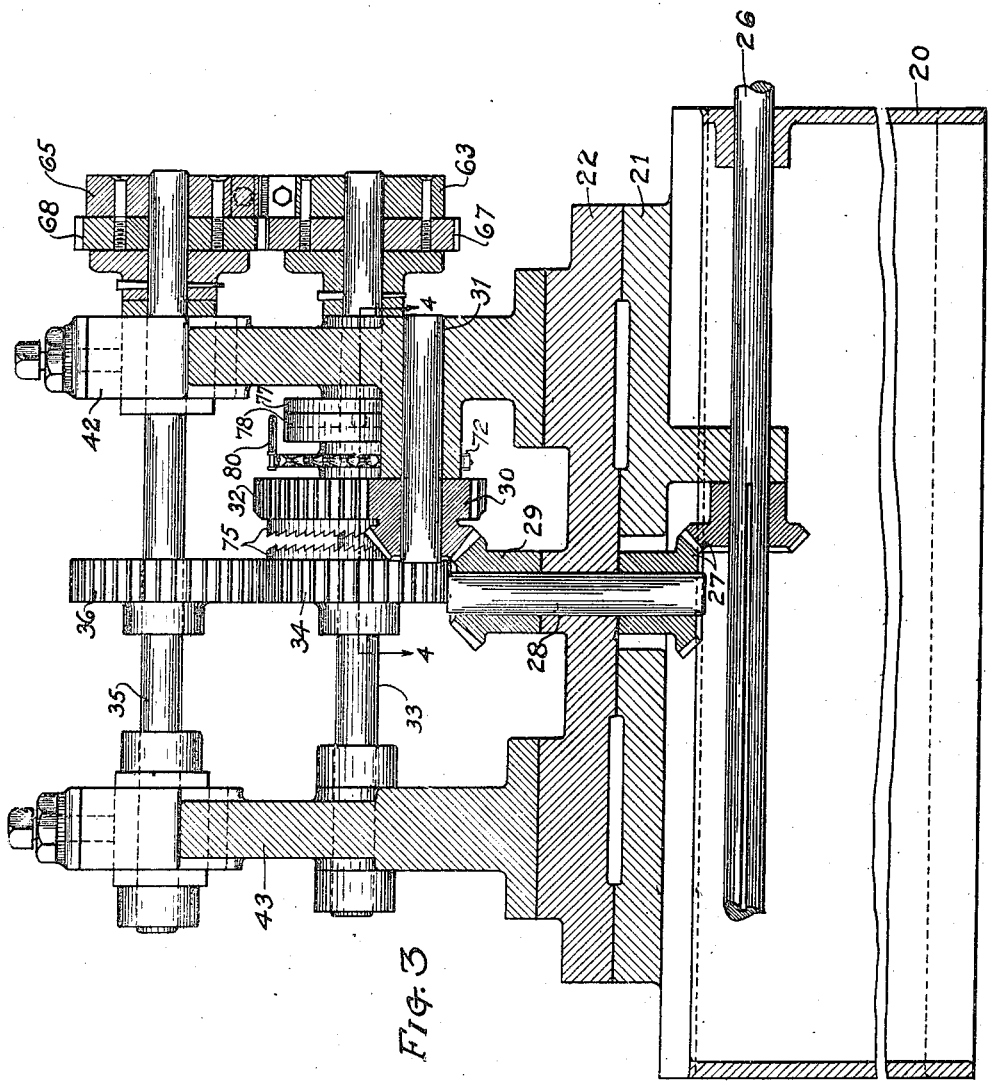

S. P. SMURR.
WIRE COILING AND CUTTING MACHINE.
APPLICATION FILED MAR. 22, 1915.
1,262,120.
Patented Apr. 9, 1918.
6 SHEETS—SHEET 4.
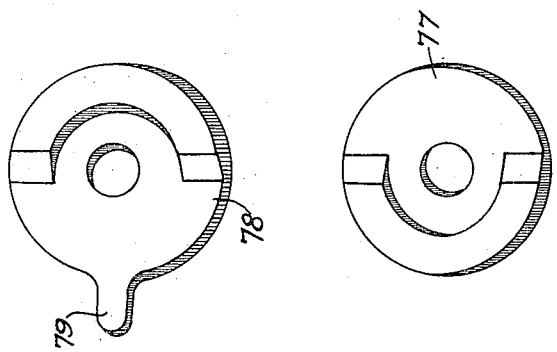
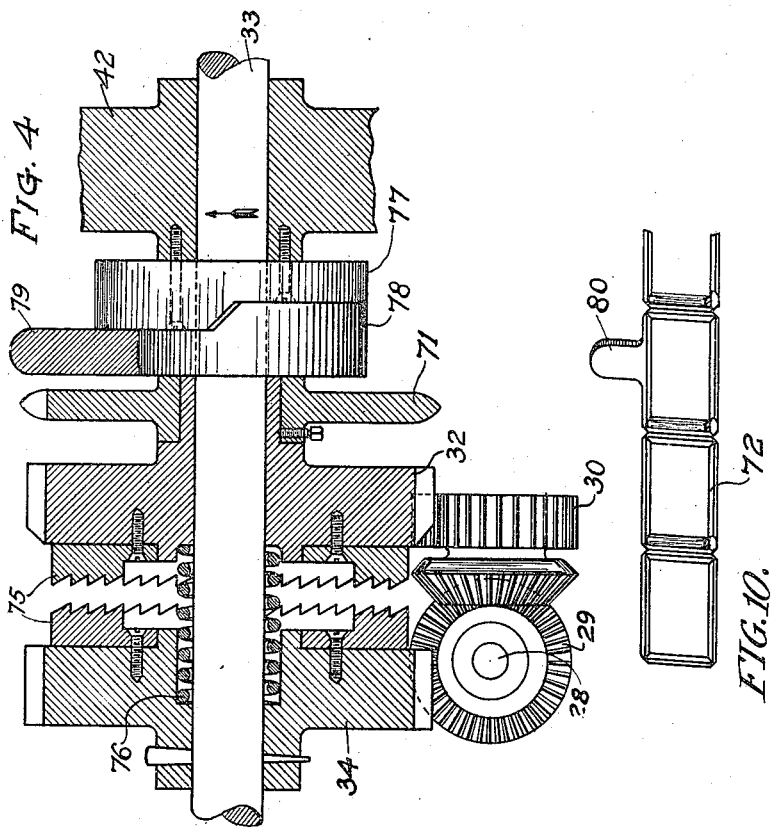

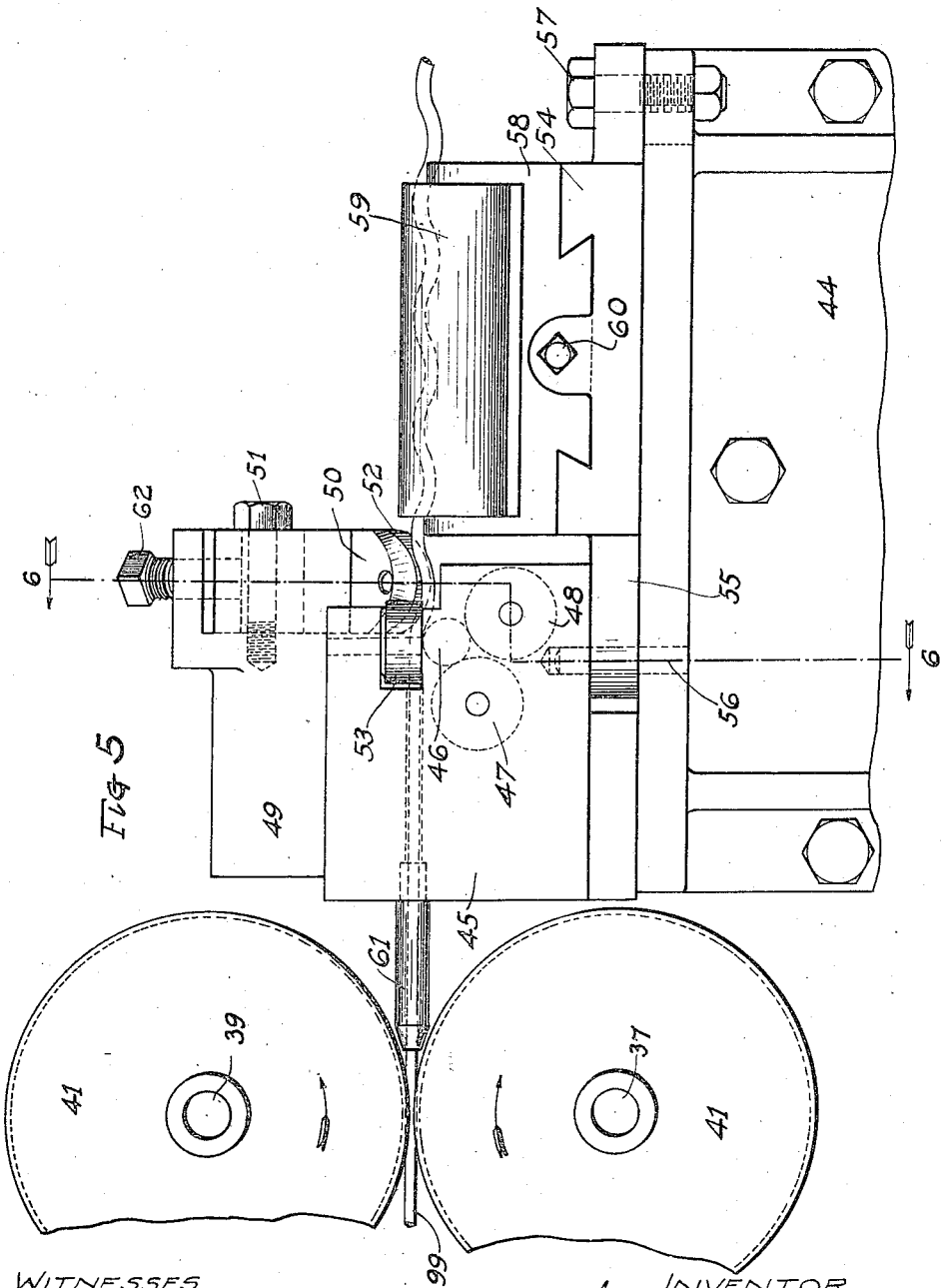

S. P. SMURR.
WIRE COILING AND CUTTING MACHINE.
APPLICATION FILED MAR. 22, 1915.
1,262,120.
Patented Apr. 9, 1918.
6 SHEETS—SHEET 6.
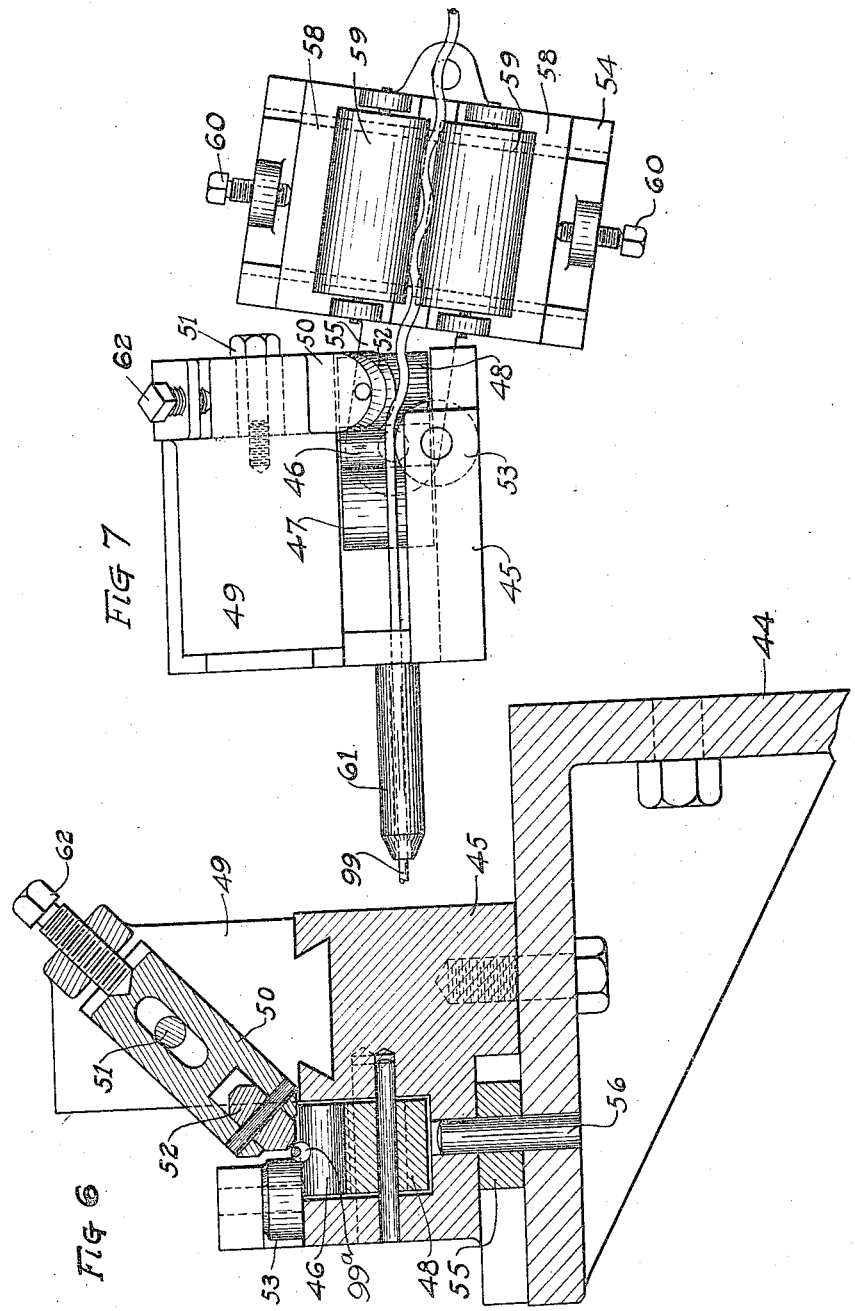

UNITED STATES PATENT OFFICE.

SAMUEL P. SMURR, OF CHICAGO, ILLINOIS, ASSIGNOR OF ONE-HALF TO FRANKLIN P. SMITH.

WIRE COILING AND CUTTING MACHINE.

1,262,120.             Specification of Letters Patent.        Patented Apr. 9, 1918.

Application filed March 22, 1915.   Serial No. 16,009.

*To all whom it may concern:*

Be it known that I, SAMUEL P. SMURR, a citizen of the United States of America, and a resident of Chicago, county of Cook, and State of Illinois, have invented certain new and useful Improvements in Wire Coiling and Cutting Machines, of which the following is a specification.

My invention relates to wire coiling and cutting machines and has for its object the production of a machine which will coil wire in helices of long pitch and small diameter. The pitch of the helix is made variable for different purposes, but the diameter of the helix is uniformly such that the axis of the helix is tangent, or nearly tangent, to the inner surface of the wire out of which the helix is formed. This gives a helix, the outside diameter of which is substantially twice the diameter of the wire used.

Another object is to coil this small diameter helix in such a way that the forward end of the helix, in leaving the coiling head, will have a screw-like movement corresponding to the pitch and diameter of the helix being formed.

In the accompanying drawings

Fig. 2 is a plan;

Fig. 3 is a section on line 3—3 of Fig. 2;

Fig. 4 is a partial section on line 4—4 of Fig. 3;

Fig. 5 is an enlarged elevation of the coiling head and feed rolls;

Fig. 6 is a section on line 6—6 of Fig. 5;

Fig. 7 is a plan of the coiling head;

Figs. 8 and 9 are detail perspective views of the operating cams for the clutch; and Fig. 10 is a plan view of a portion of the driving chain illustrating one of the lugs for shifting the cam members.

Figure 1:
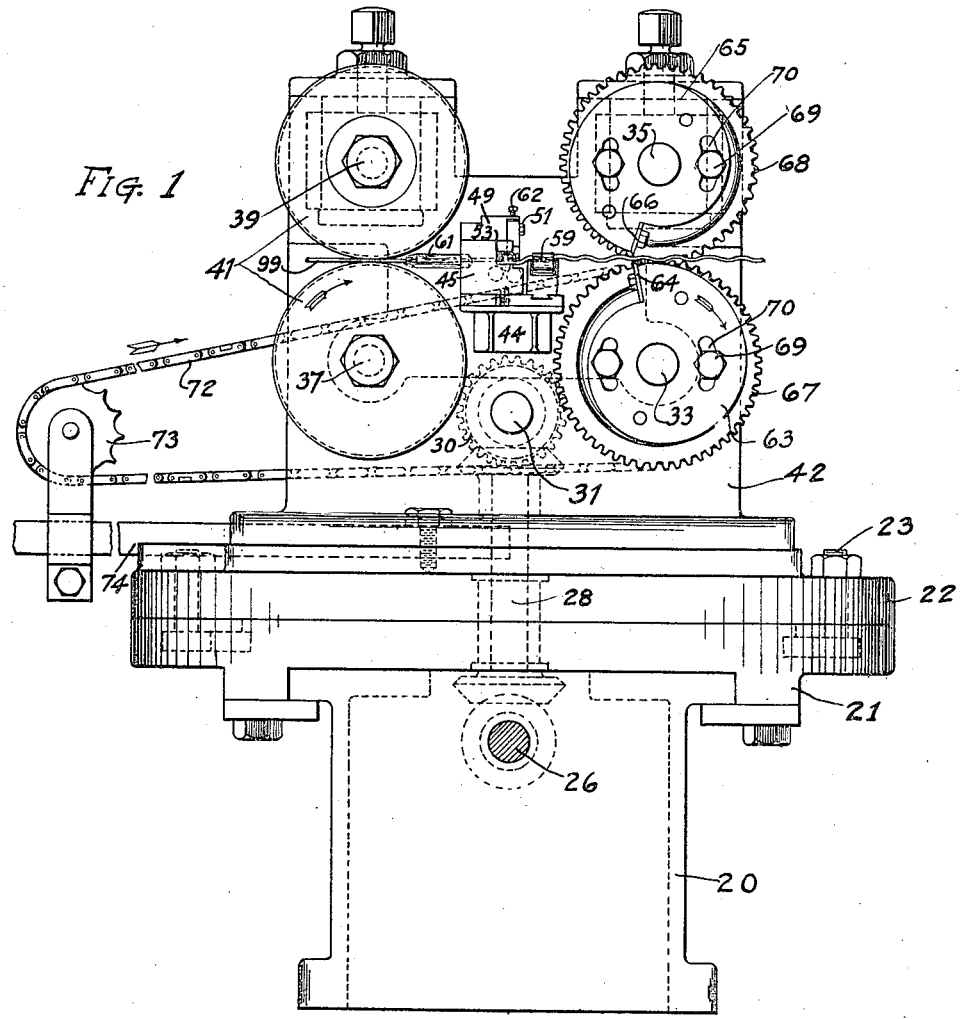
Figure 1 is an end elevation.

On the bed 20 is a longitudinally adjustable carriage 21 which carries a turntable 22 adjustable on the carriage by means of bolts 23 running through slots 24. Power is received from shaft 26 and transmitted through bevel gears 27 to a shaft 28 which is the pivoted center of the turntable 22. From here the power is conveyed through bevel gears 29 to a pinion 30 on shaft 31.

The pinion 30 engages a gear 32 loose on shaft 33, and another gear 34 fast on shaft 33 engages a gear 36 on shaft 35. The shafts 33 and 35 carry the wire cutters hereinafter described. The pinion 30 also engages a gear 38 on shaft 37, on the other end of which is a gear engaging a similar gear 40 on shaft 39. The shafts 37 and 39 carry the wire feeding rolls 41.

The shafts 33, 35, 37 and 39 are carried in bearings formed in standards 42 and 43 which are mounted upon the turntable 22. On the front face of standard 42 is a bracket 44 which carries the coiling head.

The coiling head consists of a block 45 in which a roller 46 is supported in an anti-friction bearing consisting of rollers 47 and 48. On the block is a slide 49 which carries a head 50 held at an angle of about 45 degrees and secured in place by a screw 51. At the lower end of the head 50 is a roller 52 arranged to engage the wire 99 running over the roller 46. An upright roller 53 supported in the block 45 serves to prevent the roller 52 from pushing the wire 99 bodily over the face of the roller 46.

Resting on the face of the bracket 44 is a plate 54 having a lug 55 which is pivoted on a pin 56 located below the roller 46 in about the position shown in Figs. 5 and 6. A bolt 57 (Fig. 5) operating in a suitable slot in the bracket 44 serves to secure the plate 54 at any desired adjustment about its pivot 56. On the plate 54 are slides 58 which carry idle rolls 59. Screws 60 serve to adjust the slides 58, and consequently rolls 59, toward each other. These rolls constitute an anti-friction guiding channel for the wire leaving the roll 52.

The action of the rolls in coiling the wire will be readily understood after an inspection of Figs. 6 and 7. The wire 99 is fed by the feed rolls 41 through a guide 61 to the rolls 46 and 53. In passing over the horizontal roll 46 and at the side of the vertical roll 53, the wire engages the bending or crimping roll 52. This engagement of the wire with the roll 52 bends it over the rolls 46 and 53. The sharpness of this bend depends upon the longitudinal adjustment of the slide 49 on the block 45, and the downward adjustment of the head 50 by the adjusting screw 62. The action of these rolls is to coil the wire into a helix of comparatively large diameter and one having an axis transverse to the axis of the roll 46. The coil of the wire 99 is indicated by the circle 99ª in Fig. 6 surrounding the wire, which circle indicates the wire 99 in perspective. It will be readily seen that the roll 52, as shown in Fig. 7, will tend initially to bend the end of the wire 99 into a helix about the rolls 46 and 53. Before a complete coil is formed, however, the forward end of the wire extending between the roll 52 and the rolls 59 is forced backwardly by hand in the direction of and against the face of the roll 52 and passed to a position above and between the idle rolls 59. The rolls 59 ordinarily have an angular position about that shown in Fig. 7, but this position is varied for wire of different diameters, and for coils of different pitches and different diameters. After the end of the wire is started between the rolls 59, the feed may thereafter be continuous.

The primary helix formed by the rolls 46, 53 and 52, and which has its axis transverse to the roll 46, does not differ from the ordinary coil, and the method of forming it is substantially that used in ordinary coiling heads. But when the axis of the primary helix is shifted to about the position shown by bending the wire back on the face of the roll 52, the original helix having a core larger than the roll 46 is transformed or stretched out into a new helix having a core of substantially zero size. The actual size of the core of the new helix will depend upon the extent to which the wire is bent back against the face of the roll 52, and any suitable channel or guide may be used for this purpose. This new helix has the same screw-like movement previously existing in the primary helix and found in the helices coming from ordinary coiling heads, and consequently may be fed directly into a fabric or into a screw-shaped aperture having a pitch corresponding to the pitch of the helix.

On the front end of the shafts 33 and 35 are heads 63 and 65 which carry knives 64 and 66. These heads are disks secured to gears 67 and 68 fast on shafts 33 and 35. The disks 63 and 65, and consequently the knives 64 and 66, are rotatively adjustable on the gears 67 and 68 by means of the screws 69 and slots 70 shown in Fig. 1. The wire 99, after leaving the coiling head, passes between knives 64 and 66, said knives being made with faces of sufficient width to accommodate ordinary shifts of plate 54 and rolls 59 on pivot 56.

The gear 32 is loose on shaft 33, and carries a sprocket wheel 71 which drives chain 72. This chain runs over an idle sprocket 73 longitudinally adjustable on a bar 74 carried on the turntable 22. Gear 32 carries one half of a clutch 75, the other half being carried by the gear 34 fast to shaft 32. A spring 76 (Fig. 4) serves to separate the two halves of the clutch 75.

Mounted upon the shaft 33 and secured to the adjacent standard 42, is a cam disk 77. The complementary cam disk 78 is provided with a lug 79 and is adjacent to the sprocket 71. On certain links of the chain 72 are lugs 80 adapted to engage the lug 79 on disk 78. When this occurs the cam disk 78 is rotated on the disk 77 and acts to move the gear 32 longitudinally on the shaft 33 to close the clutch 75. The closure of this clutch operates to drive shaft 33, and consequently shaft 35 and knives 64 and 66 to cut the wire 99. As soon as the disk 78 has made a half revolution the lug 80 on the chain 72 leaves the lug 79 on disk 78, and as soon as the shaft has made a complete revolution the spring 76 opens the clutch and permits the knives to come to a stop.

It will be obvious that the frequency with which the knives operate will depend upon the nearness together of the lugs 80 on chain 72. The adjustability of the idle sprocket 73 permits the chain 72 to be lengthened or shortened by inserting or removing links between the links which carry the lugs 80. The lengthening or shortening of the space between lugs 80 on the chain make it possible to cut coils of any desired length.

It will also be obvious that shifting the angular position of the idle rolls 59 will change the direction in which the coils leave the coiling head. The adjustability of the turntable 22 on the carriage 21 makes it possible to deliver the finished coils in any desired direction with respect to the entire device.

What I claim is:—

1. The combination with wire feeding and wire cutting devices, of a coiling mechanism arranged to bend the wire successively in two directions to produce a helix having a screw movement and a core of zero diameter.

2. The combination with wire coiling devices arranged to form a helical coil having a coil of material diameter, of means for transforming such primary helix into a new or secondary helix having a core of substantially zero diameter.

3. The combination with wire coiling devices arranged to form a helical coil and deliver the same with its axis projecting in a given direction with respect to the coiling devices, of guiding devices arranged to forcibly change the direction of the axis of the coil, such forcible change in direction of the axis of the coil serving to change the character of the helix delivered from the coiling devices.

4. The combination with a wire feeding device, and a roll arranged to force the wire cut of its line of feed so as to produce a helical coil of wire, of a guiding device arranged to force the wire back against the coiling roll and thereby change the form of the helix delivered.

5. The combination with a wire feeding device, and a coiling roll, of a guiding roll arranged to force the wire back against the face of the coiling roll, and means for adjusting the position of the guiding roll.

6. The combination with wire feeding devices, and wire coiling devices adapted to deliver coils in different directions for coils of different character, of a turntable upon which said feeding devices and coiling devices are mounted, said turntable being adjustable to compensate for the different directions in which different coils are delivered.

7. The combination with wire feeding devices, and a coiling head, of a coil cutter, connections from the cutter to the feeding devices so that coils of predetermined length will be cut while the coiling head is operating, and adjustable devices for varying the lengths of the coils cut.

8. Wire feeding devices, a coiling head, a coil cutter, a source of power having connections to the feeding devices and to the cutter, a normally open clutch in the connections from the power to the cutter, a continuously operating chain driven from the source of power, and devices operated by the chain for periodically closing the clutch to operate the cutter.

9. The combination with wire feeding devices, a coiling head, a coil cutter, and a source of power for operating said parts, of a normally open clutch in the connections from the power to the cutter, a cam for closing said clutch, a chain driven from the source of power, and projections on certain links of said chain, said projections being adapted to operate said cam to close said clutch at intervals corresponding to the intervals of said projections on said chain.

Signed at Chicago, Ill., this 20th day of March 1915.

SAMUEL P. SMURR.

Witnesses:
C. L. REDFIELD,
WALTER H. REDFIELD.

Copies of this patent may be obtained for five cents each, by addressing the "Commissioner of Patents, Washington, D. C."